(12) United States Patent
Wang et al.

(10) Patent No.: US 10,726,581 B2
(45) Date of Patent: Jul. 28, 2020

(54) SYSTEM AND METHOD FOR SCENE-SPACE VIDEO PROCESSING

(71) Applicant: Disney Enterprises, Inc., Burbank, CA (US)

(72) Inventors: Oliver Wang, Zurich (CH); Marcus Magnor, Wolfenbuttel (DE); Felix Klose, Braunschweig (DE); Jean-Charles Bazin, Zurich (CH); Alexander Sorkine Hornung, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 112 days.

(21) Appl. No.: 14/743,618

(22) Filed: Jun. 18, 2015

(65) Prior Publication Data

US 2016/0373717 A1 Dec. 22, 2016

(51) Int. Cl.
| | |
|---|---|
| *H04N 13/00* | (2018.01) |
| *G06T 7/90* | (2017.01) |
| *H04N 13/111* | (2018.01) |
| *H04N 13/15* | (2018.01) |

(52) U.S. Cl.
CPC .............. *G06T 7/90* (2017.01); *H04N 13/111* (2018.05); *H04N 13/15* (2018.05); *G06T 2207/10016* (2013.01); *G06T 2207/10028* (2013.01)

(58) Field of Classification Search
CPC ..... H04N 13/0022; G06T 5/003; G06T 5/002; G06T 2207/10021

USPC ...... 348/43, 50, 180, 239, 42; 345/474, 419; 382/257; 359/24
See application file for complete search history.

(56) References Cited

U.S. PATENT DOCUMENTS

| | | | | |
|---|---|---|---|---|
| 8,723,920 | B1* | 5/2014 | Hoppenstein | H04N 13/315 348/42 |
| 8,866,972 | B1* | 10/2014 | Dai | G01J 3/28 348/180 |
| 8,948,533 | B2* | 2/2015 | Golan | G06T 7/0061 382/257 |
| 2004/0075663 | A1* | 4/2004 | Plante | G06T 13/00 345/474 |
| 2004/0222987 | A1* | 11/2004 | Chang | G01B 11/2509 345/419 |
| 2007/0127101 | A1* | 6/2007 | Oldroyd | G01C 11/00 359/24 |
| 2013/0215239 | A1* | 8/2013 | Wang | G06T 7/0071 348/50 |

(Continued)

*Primary Examiner* — Jayanti K Patel
*Assistant Examiner* — Richard B Carter
(74) *Attorney, Agent, or Firm* — Farjami & Farjami LLP

(57) ABSTRACT

There is provided a video processing system for use with a video having frames including a first frame and neighboring frames of the first frame. The system includes a memory storing a video processing application, and a processor. The processor is configured to execute the video processing application to sample scene points corresponding to an output pixel of the first frame of the frames of the video, the scene points including alternate observations of a same scene point from the neighboring frames of the first frame of the video, and filter the scene points corresponding to the output pixel to determine a color of the output pixel by calculating a weighted combination of the scene points corresponding to the output pixel.

10 Claims, 10 Drawing Sheets

(56) References Cited

U.S. PATENT DOCUMENTS

2015/0077592 A1\* 3/2015 Fahey .................. H04N 5/2224
                                                            348/239

\* cited by examiner

SYSTEM AND METHOD FOR SCENE-SPACE VIDEO PROCESSING

BACKGROUND

Many compelling video processing effects can be achieved if per pixel depth information and three-dimensional (3D) camera calibrations are known. Scene-space video processing, where pixels are processed according to their 3D positions, has many advantages over traditional image-space processing. For example, handling camera motion, occlusions, and temporal continuity entirely in two-dimensional (2D) image-space can in general be very challenging, while dealing with these issues in scene-space is simple. As scene-space information becomes more and more widely available due to advances in tools and mass market hardware devices, techniques that leverage depth information will play an important role in future video processing approaches. However, the success of such methods is highly dependent on the accuracy of the scene-space information.

SUMMARY

The present disclosure is directed to systems and methods for scene-space video processing, substantially as shown in and/or described in connection with at least one of the figures, as set forth more completely in the claims.

DETAILED DESCRIPTION

Figure 1:
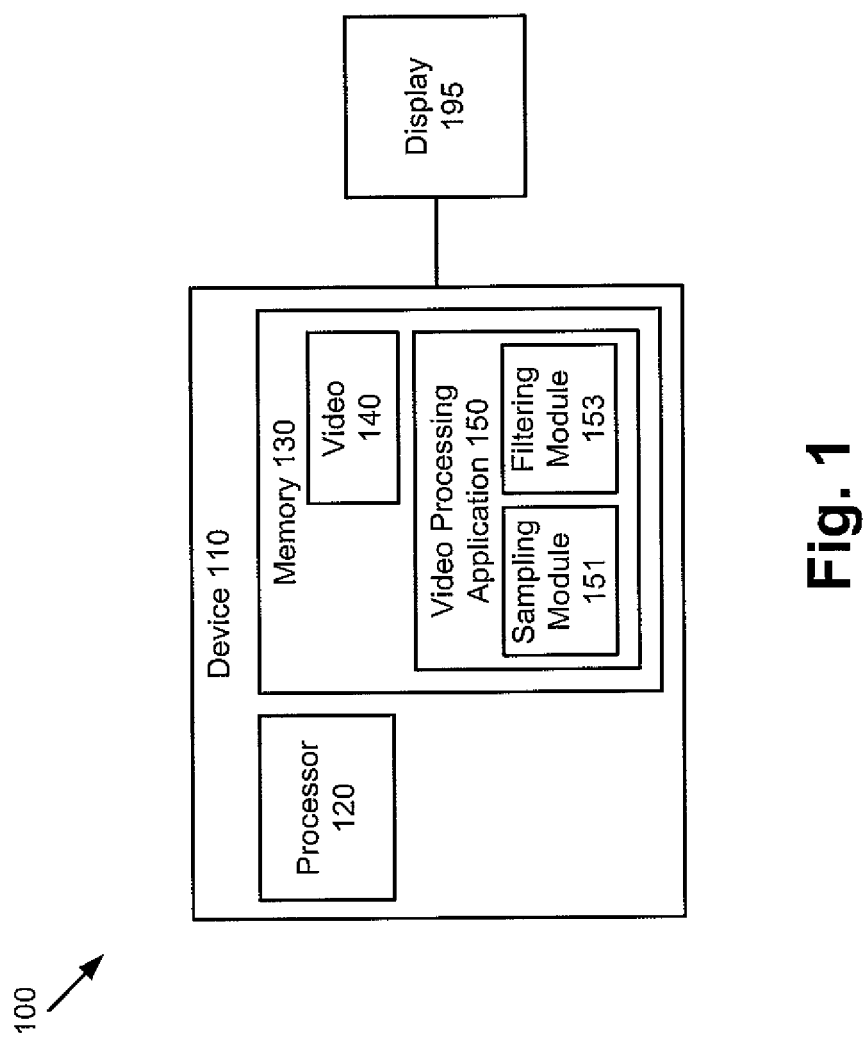
FIG. 1 shows a diagram of an exemplary video processing system, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary video processing system, according to one implementation of the present disclosure. As shown, video processing system 100 includes device 110 and display 195. Device 110 includes processor 120 and memory 130. Processor 120 may access memory 130 to store received input or to execute commands, processes, or programs stored in memory 130. Processor 120 may be a microprocessor or a similar hardware processor used in a computing device. Memory 130 is a hardware storage capable of storing commands, processes, and programs for execution by processor 120. Memory 130 is a non-transitory storage device capable of storing data, commands, processes, and programs for execution by processor 120. As shown in FIG. 1, memory 130 includes video 140 and video processing application 150.

Video 140 may be a video content including a plurality of frames. Each frame of video 140 may include a plurality of scene points, where a scene point may be a portion of a frame that is visible in a pixel of a frame of video 140 when displayed on display 195.

Video processing application 150 includes sampling module 151 and filtering module 153. For each pixel of an output frame of video 140, video processing application 150 may sample a plurality of scene points. In some implementations, a sample may include all scene points that lie within a 3D frustum defined by an output pixel in the output frame. Video processing application 150 may then filter this sample set to determine a color of the output pixel by weighting the samples appropriately. Video processing application 150 may compute output color O(p) for each pixel p in an output frame of video 140. For each O(p), video processing application 150 may sample a set of scene points S(p) directly from an input video I. A scene point $s \in R^7$ is composed of color ($s_{rgb} \in R^3$), scene-space position ($s_{xyz} \in R^3$), and frame time ($s_t \in R$).

Video processing application 150 may also perform pre-processing of video 140. In some implementations, video processing application 150 may derive camera calibration parameters (extrinsics and intrinsics), C, and depth information, D, from the input video I. Images may be processed in an approximately linear color space by gamma correction. Video processing application 150 may compute camera calibration parameters automatically using commonly available commercial tools. Video processing application 150 may derive a depth map from input video I and camera calibration parameters C using multi view stereo techniques, or information from a depth sensor, such as a Kinect sensor. Video processing application 150 may use a simple, local depth estimation algorithm where the standard multi-view stereo data-term may be computed over a temporal window around each frame. For each pixel, this entails searching along a set of epipolar lines defined by C, and picking the depth value with the lowest average cost using, for example, the sum of squared RGB color differences on 3×3 patches. This simple approach does not include any smoothness term, and therefore does not require any complex global optimization scheme, rendering it easy to implement and efficient to compute. The calculation may yield many local depth outliers, introducing high-frequency "salt and-pepper" noise in the depth map.

Sampling module 151 may sample a plurality of scene points corresponding to a frame or a plurality of frames of video 140, or an output pixel of an output frame of video 140. In some implementations, sampling module 151 may sample scene points corresponding to the output frame and neighboring frames of video 140. Neighboring frames may include a frame that is immediately before the output frame in video 140, a frame that is immediately after the output frame in video 140, a plurality of frames sequentially preceding the output frame in video 140, a plurality of frames sequentially following the output frame in video 140, or a combination of frames before and after the output frame. In some implementations, sampling module 151 may determine a sample set of scene points corresponding to an output pixel of the output frame of video 140. In some implementations, sampling module 151 may create a point cloud by projecting a plurality of scene points visible to a pixel or a plurality of pixels in an input frame I using camera matrix C based on the respective depth value D(p) of each of the scene points. In some implementations, sampling module 151 may form the point cloud by projecting scene points from a plurality of frames, including the output frame and neighboring frames. By sampling the output frame and neighboring frames, sampling module 151 may include multiple observations of the same scene point visible to the output pixel in the sample set.

Filtering module 153 may determine an output color for each output pixel in the output frame based on a plurality of sampled scene points. Filtering may be defined as a function $\Phi(S) \in R^7 \rightarrow R^3$ that takes a sample set and determines an output color for each output pixel. Among the scene points in the sample set, some will correspond to a scene point, but others will come from erroneous observations. Erroneous observations may include observations of occlusion events, incorrect 3D information, or observations of moving objects. To calculate the color of the output pixel, filtering module 153 may use a weighting function to emphasize scene point observations that are not erroneous observations, and de-emphasize the contribution of erroneous observations. In some implementations, filtering module 153 may use a filtering function of the form:

$$O(p) = \Phi(S(p)) = \frac{1}{|W|} \sum_{s \in S(p)} w(s) s_{rgb} \quad (1)$$

where w(s) is a video processing effect specific weighting function and $|W| = \Sigma_{s \in S(p)} w(s)$ is the sum of all weights.

In some implementations, filtering module 153 may calculate a weighted combination of the plurality of scene points corresponding to an output pixel of video 140 to determine a video processing effect. Filtering module 153 may determine a video processing effect by applying different weighting functions w(s) to the 7D samples in the sample set. In some implementations, a video processing effect may be determined by a video processing effect specific weighting function. In particular, it is straightforward to specify effects based on scene-space coordinates by making w(s) depend on the scene-space position of a sample.

Display 195 may be a display suitable for displaying videos, video processing, and video processing effects. In some implementations, display 195 may be a television, a computer monitor, a display of a smart phone, a display of a tablet computer. Display 195 may include a light-emitting diode (LED) display, an organic LED (OLED) display, an liquid crystal display (LCD), a plasma display panel (PDP), or other display suitable for viewing and processing videos. In some implementations, display 195 may be included in device 110.

Figure 2:
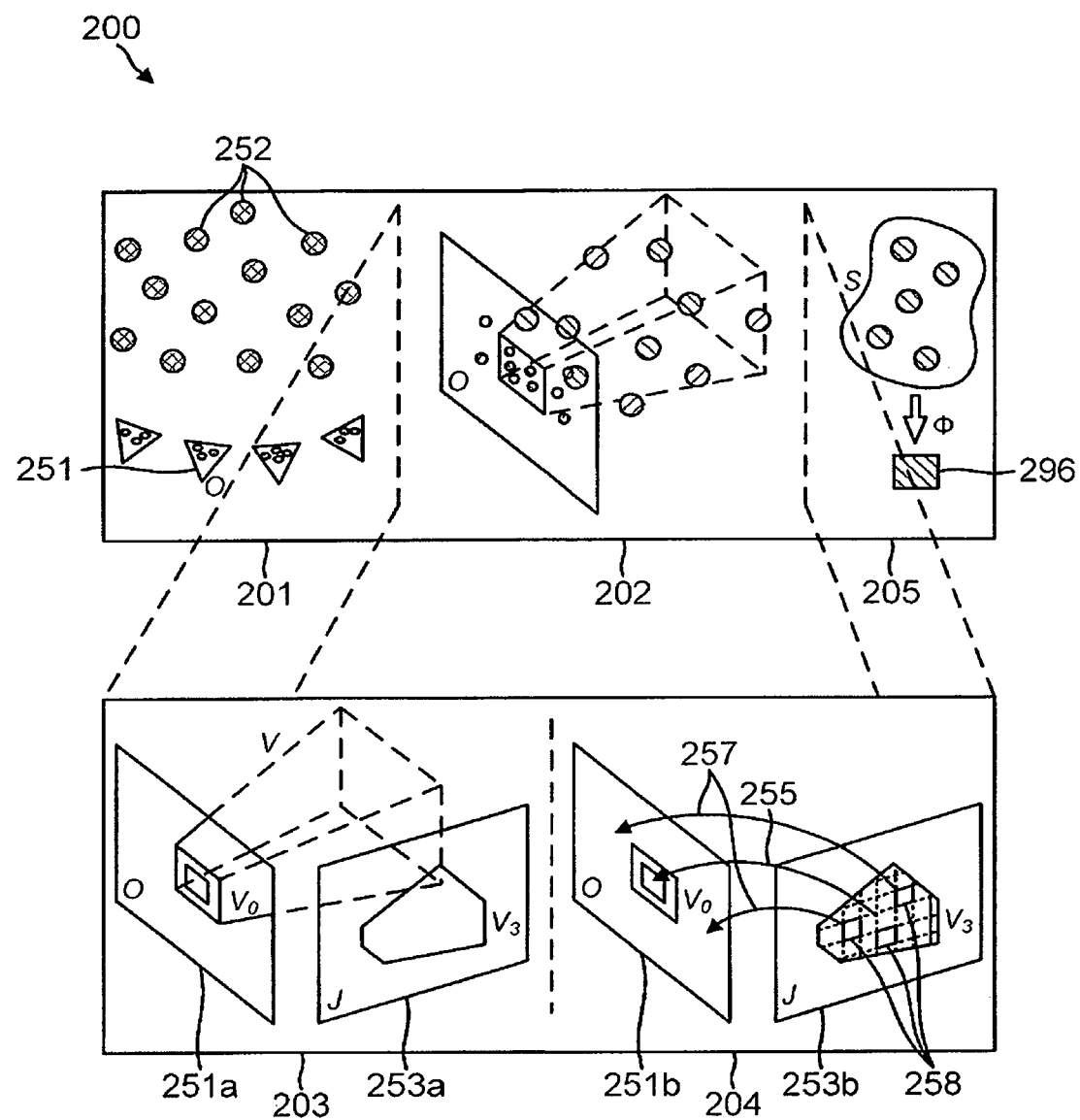
FIG. 2 shows an exemplary diagram of a scene-space video processing, according to one implementation of the present disclosure.

FIG. 2 shows an exemplary diagram of scene-space video processing, according to one implementation of the present disclosure. At 201, a selected number of frames are projected into scene-space, including output frame 251 and neighboring frames of video 140. Sampling module 151 may project scene points in the selected number of frames to form a point cloud, where each scene point has a corresponding cloud point 252.

At 202, sampling module 151 identifies all cloud points 252 that fall in frustum V of an output pixel and within the output pixel, and the cloud points 252 that are within the projection of frustum V, but fall outside of the output pixel. At 203, sampling module 151 identifies frustum V defined by a pixel in output frame O. In order to find which cloud points 252 project into frustum V, video processing system 100 looks at the projection of frustum V into a single frame J. All cloud points 252 that project into V must reside inside the respective 2D convex hull $V_J$ (determined by projecting the frustum V into J), as shown in FIG. 2. Video processing system 100 operates on projected cloud points 258 that lie inside the area of in $V_J$ in image domain, and determines the required samples that should be validated or checked.

For example, given output camera matrix $C_O$, the 3D frustum volume V of a pixel p is simply defined as a standard truncated pyramid using the pixel location ($p_x$, $p_y$) and a frustum size l:

$$V = \left\{ C_O^{-1} \cdot \left[ p_x \pm \frac{l}{2}, p_y \pm \frac{l}{2}, \{near, far\}, 1 \right]^T \right\} \quad (2)$$

The 2D frustum hull $V_J$ is obtained by individually projecting the 3D vertices of frustum V into J, and connecting the projected vertices in J. Because projected cloud pints 258 that fall inside of $V_J$ may correspond to cloud points that lie in front of or behind frustum V, video processing system 100 cannot simply accept all projected cloud points that fall within $V_J$.

At 204, video processing application 150 rasterizes all projected cloud points 258 that fall within $V_J$, and sampling module 151 checks whether their projection back into the output frame falls within $V_O$. Sampling module 151 checks each pixel q in $V_J$ to determine whether it maps to a position in O that falls within $V_O$. Specifically, video processing system 100 checks the distance from the projected cloud point mapped back into O to the original output pixel p.

$$\| p - C_O \cdot C_J^{-1} \cdot [q_x, q_y, q_d, 1]^T \| 1 < \frac{l}{2} \quad (3)$$

Scene points corresponding to cloud points that are within projected frustum $V_J$ and that map to a position within the original output pixel are added to the sample set. Arrow 255 indicates a projected cloud point that satisfies the conditions to be sampled, while the arrows 257 indicate projected cloud points that were tested, but rejected. A projected cloud point that passes this test is converted into a 7D sample and added to the sample set S(p).

At 205, filtering module 153 determines output pixel 296's color by calculating a weighted combination of the plurality of scene points corresponding to the output pixel. In case of error-free depth maps, camera poses, and a static scene, the cloud points inside frustum V, where l=1, would be a complete set of all observations of the scene points corresponding to the cloud points, as well as any occluded scene points. However, inaccuracies in camera pose and depth may result in erroneous observations including false positives, i.e., outlier samples wrongly gathered, and false negatives, i.e., scene point observations that are missed. In some implementations, to account for depth and camera calibration inaccuracies, sampling module 151 may increase the per-pixel frustum size l to cover a wider range, such as l=3 pixels.

Figure 3:
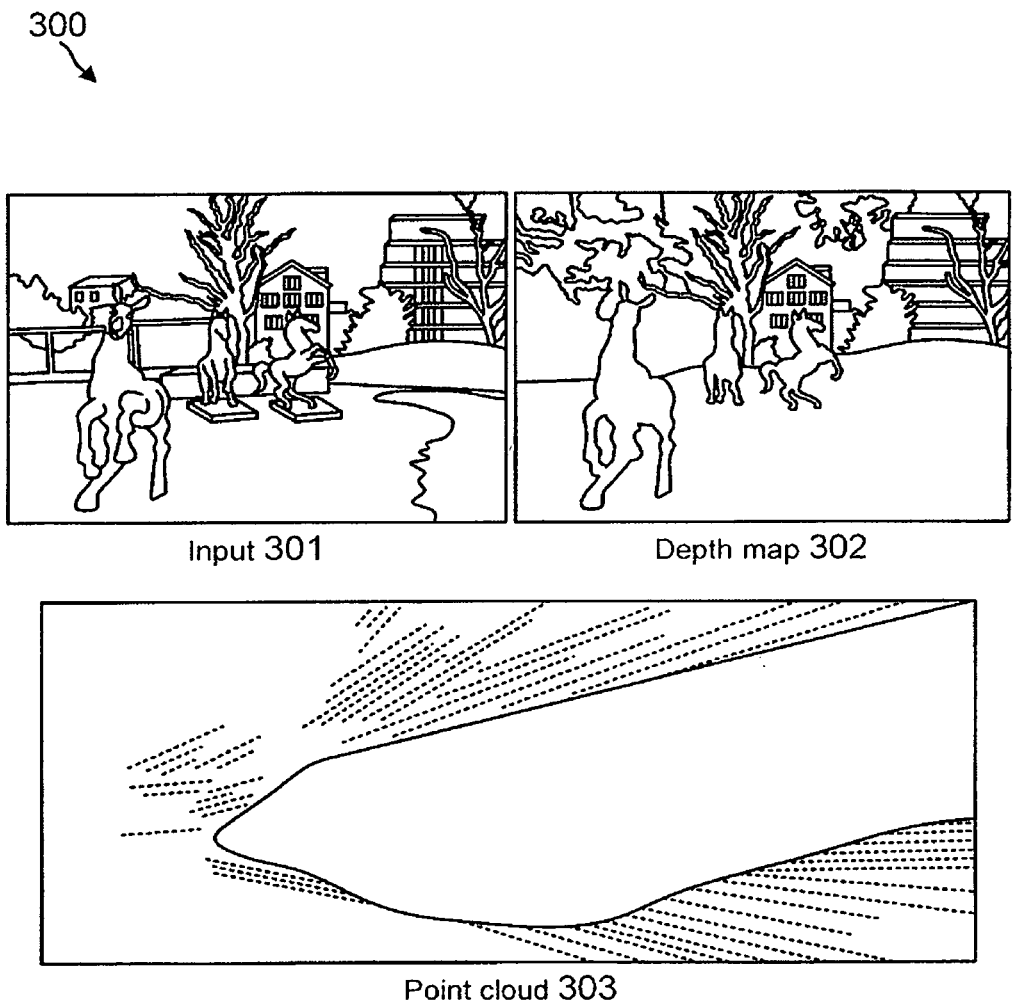
FIG. 3 shows a diagram of an exemplary scene-space point cloud, according to one implementation of the present disclosure.

FIG. 3 shows a diagram of an exemplary scene-space point cloud, according to one implementation of the present disclosure. Depth map 302 corresponds to input 301. Based on depth map 302, sampling module 151 projects input 301 and a plurality of neighboring frames to create point cloud 303, including a plurality of cloud points corresponding to scene points in each of the projected frames. Point cloud 303 shows a side view of five images projected into scene-space.

Figure 4:
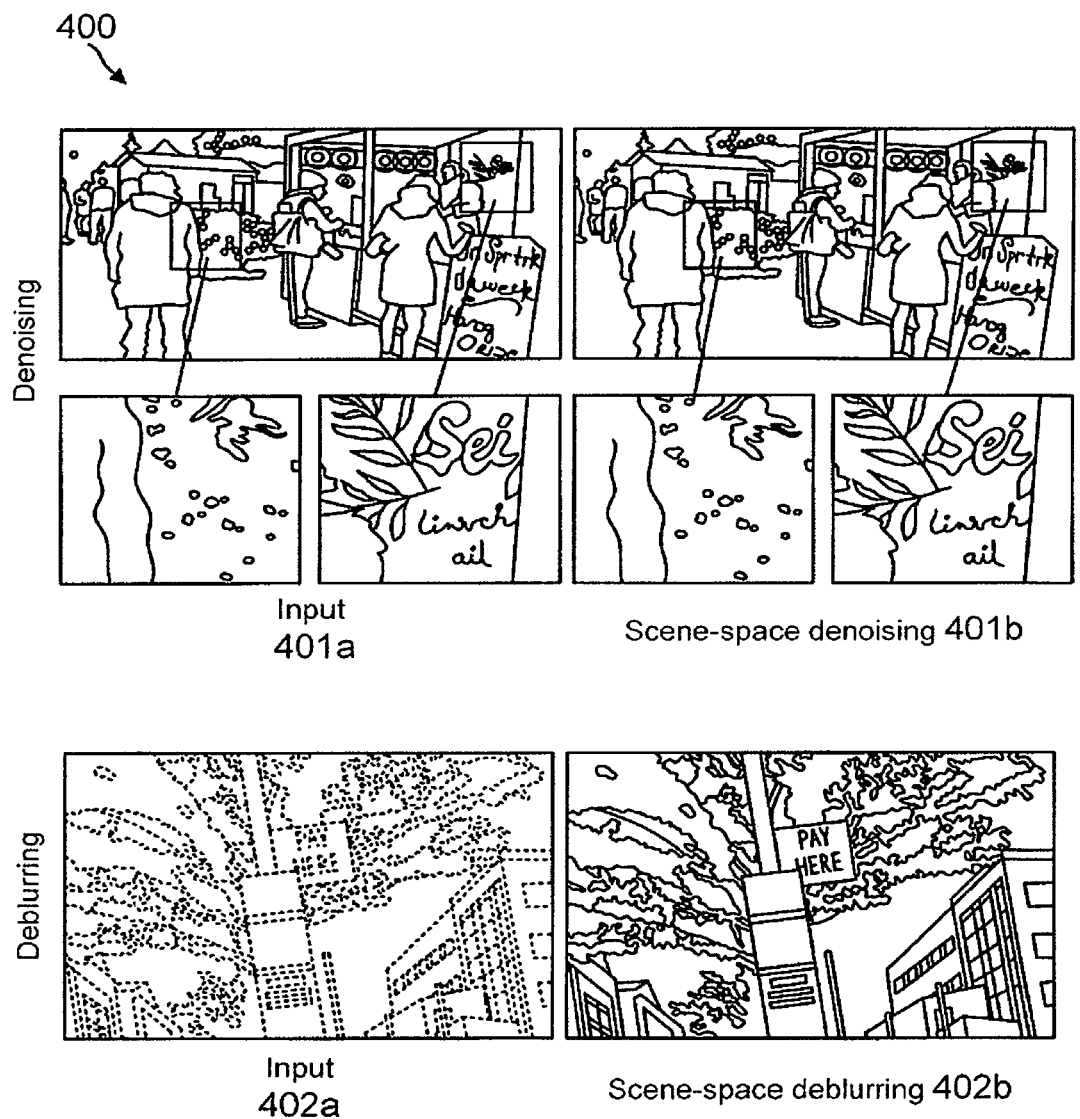
FIG. 4 shows examples of scene-space video processing effects, according to one implementation of the present disclosure.

FIG. 4 shows examples of scene-space video processing effects, according to one implementation of the present disclosure. Filtering module 153 may use different calculations to filter the plurality of scene points sampled by sampling module 151. In some implementations, filtering module 153 may be used to create different video processing effects. Diagram 400 shows examples of a denoising effect at 401, and a deblurring effect at 402.

As the same scene point is observed in a plurality of frames of video 140, video processing system 100 can use these multiple observations to denoise frames of video 140. Averaging all samples in S(p) by setting the weighting function w(s) equal to one may result in occluded scene points and noisy samples corrupting the result. Filtering is then performed as a weighted sum of samples, where weights are computed as a multivariate normal distribution with mean $s_{ref}$.

$$w_{denoise}(s) = \exp\left(-\frac{(s_{ref} - s)^2}{2\sigma^2}\right) \quad (4)$$

Input frame 401a depicts an input frame of video 140 consisting of a blurry image. At 401b, an example of the output frame after applying scene-space deblurring shows the "Pay Here" sign is legible. Video processing system 100 can deblur video frames that are blurry as a result of sudden camera movements, such as shaking during hand-held capture, using the same equation used for denoising, modified by a measure of frame blurriness:

$$w_{deblur}(s) = \exp\left(-\frac{(s_{ref} - s)^2}{2\sigma^2}\right) \sum_{q \in I^{s_f}} |\nabla I^{s_f}(q)| \quad (5)$$

where $\nabla$ is the gradient operator, and $I^s f$ is the frame from which sample s originated. The first part is the same multivariate normal distribution as Equation 4, and the second part is a measure of frame blurriness computed as the sum of gradient magnitudes in the image from which s was sampled. This de-emphasizes the contribution from blurry frames when computing an output color. When implementing the video processing effect of deblurring, filtering module 153 may use parameters such as $\sigma_{rgb}=200$, $\sigma_{xyz}=10$, $\sigma_f=20$.

While the above notation may be used for clarity, video processing application 150 represents samples in a 7D space and using a diagonal covariance matrix, with the diagonal entries $\sigma_{rgb}$ for the three color dimensions, $\sigma_{xyz}$ for the scene-space position and $\sigma_f$ for the frame time. For denoising, filtering module 153 may use parameters such as $\sigma_{rgb}=40$, $\sigma_{xyz}=10$, $\sigma_f=6$.

Figure 5:
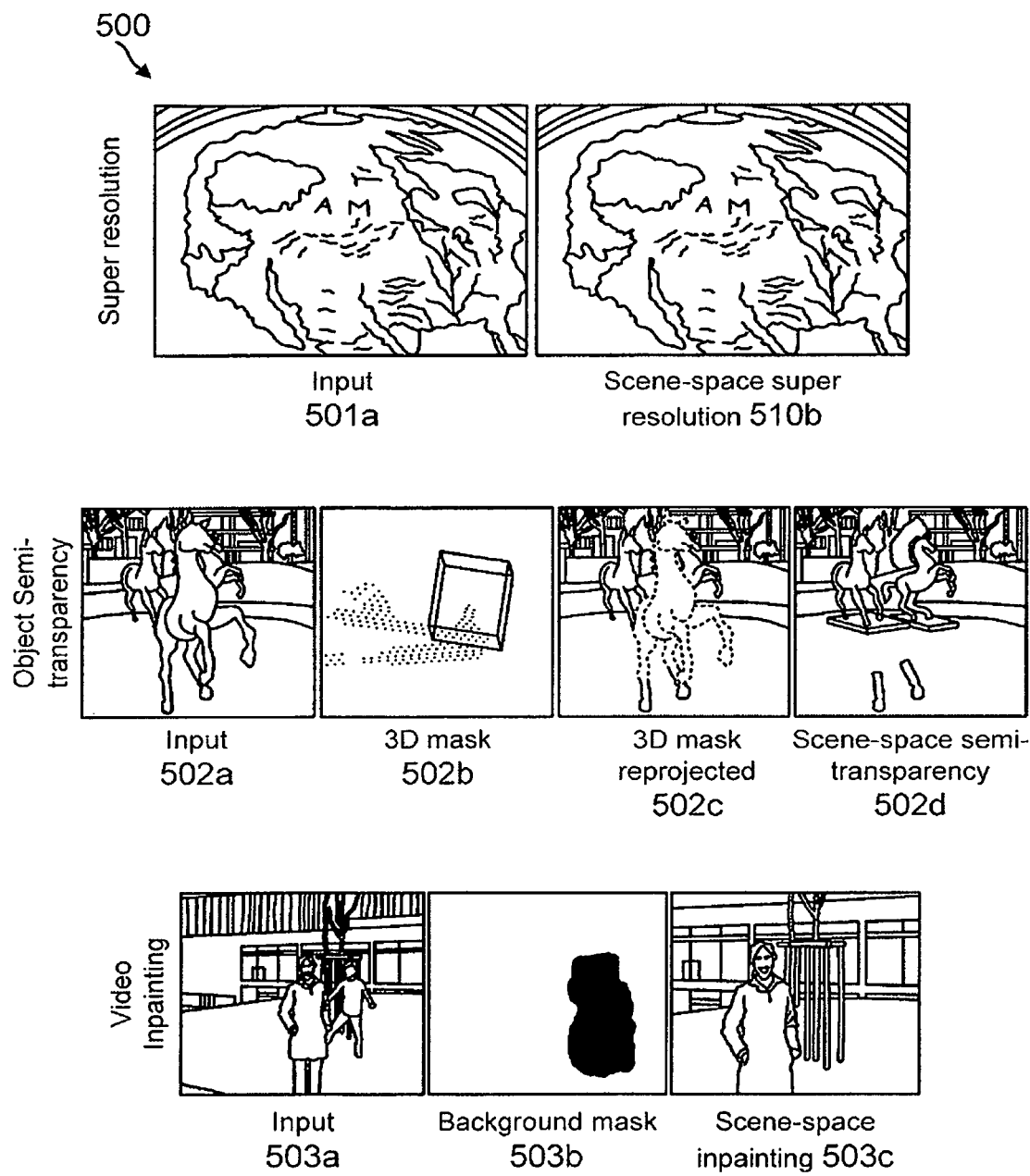
FIG. 5 shows examples of scene-space video processing effects, according to one implementation of the present disclosure.

FIG. 5 shows examples of scene-space video processing effects, according to one implementation of the present disclosure. Filtering module 153 may also perform a scene space form of super resolution to create a high-resolution output video O' from a low-resolution input video I. To apply a super resolution effect, filtering module 153 applies a weighting scheme that emphasizes observations of scene points with the highest available resolution. Filtering module 153 determines that each scene point is most clearly recorded when it is observed from as close as possible (i.e., the sample with the smallest projected area in scene-space). To measure this, filtering module 153 applies a scene space area property, $s_{area}$. The scene-space area of a sample is computed by projecting its pixel corners into the scene and computing the area of the resulting quad; assuming the output pixels are square, it is sufficient to compute the length of one edge. In some implementations, filtering module 153 may let $p_l$ and $p_r$ be the left and right edge pixel locations of a sample located at p and C be the camera matrix for the sample's frame $s_f$:

$$s_{area} = \|C^{-1} \cdot [p_l, D(p), 1]^T - C^{-1} \cdot [p_r, D(p), 1]^T\|_2^2 \quad (6)$$

Filtering module 153 applies the weighting function:

$$w_{ar}(s) = \exp\left(-\frac{(s_{ref} - s)^2}{2\sigma^2}\right) \exp\left(-\frac{s_{area}^2}{2\sigma_{area}^2}\right) \quad (7)$$

The latter term de-emphasizes scene point observations that were observed from farther away, and emphasizes scene point observations with more detailed information. In order to generate reference samples $s_{ref}$ in this case, video processing system 100 bi-linearly upsamples I to the output resolution. Because sampling module 151 allows samples to be gathered from arbitrary pixel frustums, super resolution uses samples from frustums corresponding to pixel coordinates from O', rather than O. For scene-space super resolution, filtering module 153 may use parameters such as $\sigma_{rgb}=50$, $\sigma_{area}=0.02$.

Diagram 500 shows an example of scene-space super resolution at 501. 501a shows an input frame, and 501b shows the result of scene-space super resolution, showing significantly higher resolution, including legible words appearing on the globe in 501b.

At 502, diagram 500 shows an example of the video processing effect of object semi-transparency. In some implementations, object semi-transparency may be used to "see-through" objects by displaying content that is observed behind the object in neighboring frames. 502a shows an input frame of video 140. Object semi-transparency requires a user to specify which objects should be made transparent, either by providing per frame image masks M, where M(p)=1 indicates that pixel should be removed, or a scene-space bounding region. 502b shows a 3D mask of input frame 502a, and 502c shows the mask projected into input frame 502a. When scene-space bounding region is used, filtering module 153 projects all samples that fall into the scene-space bounding region back into the original images to create M. An example of scene-space object semi-transparency is shown at 502*d*.

When applying video processing effects including object semi-transparency and inpainting, filtering module 153 may not have a reference $s_{ref}$ in S(p) for the mask region. In such situations, filtering module 153 may instead compute an approximate reference sample by taking the mean of all samples, $$s_{ref} = \frac{1}{|S(p)|} \sum_{s \in S(p)} s \qquad (8)$$

and weight samples with the following function, $$w_{inpoint}(s) = \begin{cases} \exp\left(-\frac{(s_{ref}-s)^2}{2\sigma^2}\right) & \text{when } M(s_p) = 0 \\ 0 & \text{when } M(s_p) = 1 \end{cases} \qquad (9)$$

Applying this weighting function, filtering module 153 computes a weighted combination of samples based on their proximity to the mean sample. If video processing application 150 iterated this procedure, it would amount to a weighted mean-shift algorithm that converges on cluster centers in S(p). However, in practice, after two steps the result visually converges. To achieve semi-transparent results, filtering module 153 may add the standard multivariate weighting to the input frame I(p) and use $\sigma_{rgb}=80$, in order to emphasize similar color samples.

An example of scene-space inpainting is shown at 503. At 503*a*, diagram 500 shows an input frame of video 140, including an object to be removed. 503*b* shows the frame with masking, indicating the portion of the frame to be removed. 503*c* shows the resulting output frame, including the preservation of objects previously occluded by the removed object in input frame 503*a*. For inpainting, filtering module 153 may use parameter values $\sigma_{rgb}=55$.

Figure 6:
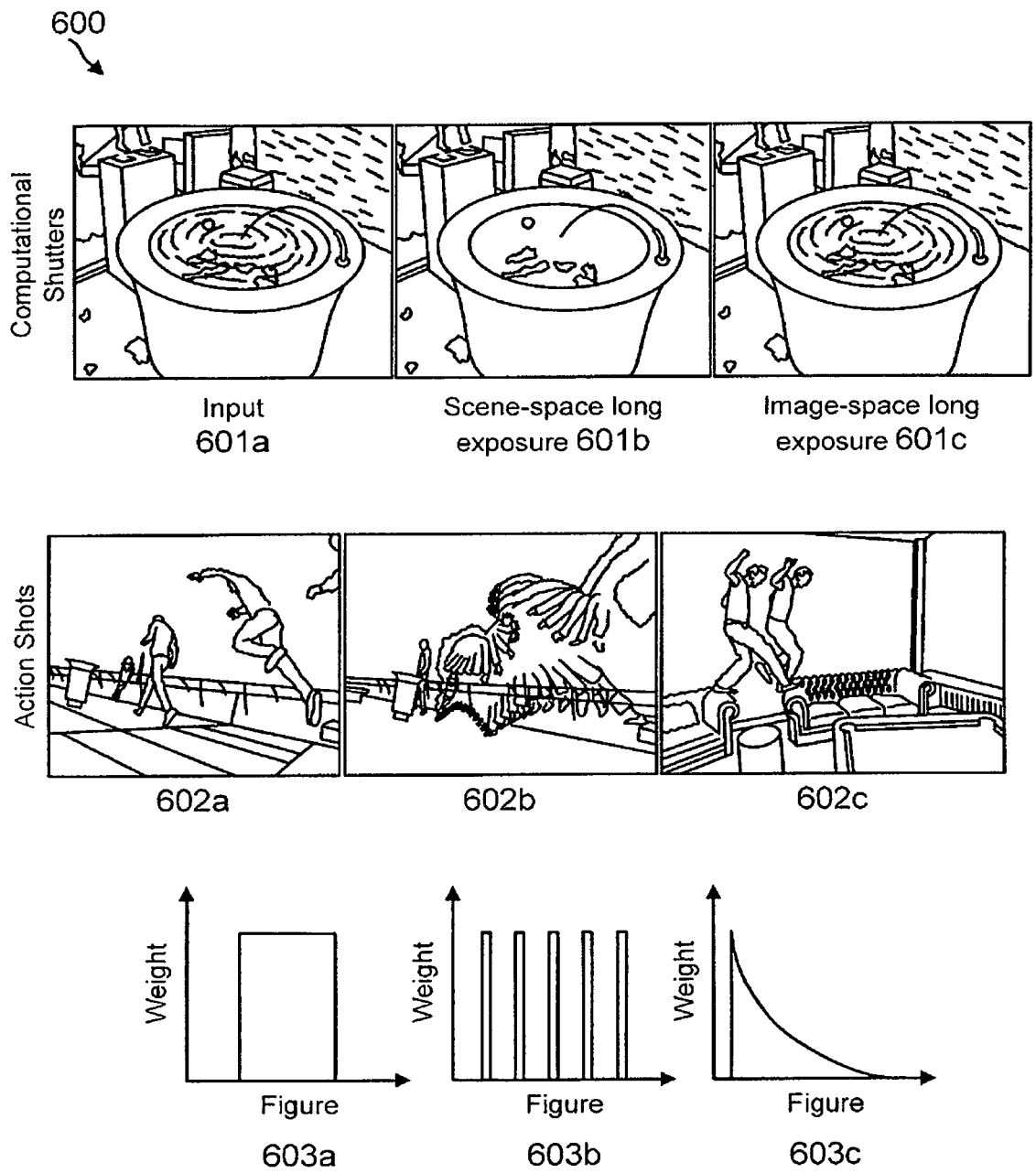
FIG. 6 shows examples of scene-space video processing effects and related information, according to one implementation of the present disclosure.

FIG. 6 shows examples of scene-space video processing effects and related information, according to one implementation of the present disclosure. In some implementations, filtering module 153 may apply a video processing effect of a computational scene-space shutter. A "computational shutter" replaces the process of a camera integrating photons that arrive at a pixel sensor with a controlled post-processing algorithm. By extending this concept into scene space, video processing application 150 may generate compelling results that are fully consistent over camera motion. In this case, a shutter function, $w_{shutter}$, replaces the weighting function, such as:

$$W_{compshutter}(s) = \xi(s_f) \qquad (10)$$

where $\xi(s_f)$ is a box function in a typical camera. A straightforward example of scene-space long exposure shot is shown at 601. At 601*a*, an exemplary input frame is shown. The effect of scene-space long exposure is shown at 601*b*, where static elements of the frame remain clear, but the water is blurred. For comparison, 601*c* shows image space long exposure, where the whole frame is blurry as a result of camera movement. As opposed to image-space long exposure shots, scene-space long exposure results in time-varying components becoming blurred but the static parts of the scene remain sharp, despite the moving camera.

Diagram 600 shows action shots at 602*a-c*, which are discussed in conjunction with graph s 603*a-c*. Graphs 603*a-c* show possible alternatives for $\xi(s_f)$. If filtering module 153 determines $\xi(s_f)$ to be an impulse train, as shown in 603*b*, and applies it only in a user-defined scene-space region, video processing application 150 can obtain "action shot" style videos. By using a long-tail decaying function, as shown in graph 603*c*, filtering module 153 may create trails of moving objects. Image 602*b* depicts an action shot according to the computational shutter having a long falloff. These effects are related to video synopsis, as they give an immediate impression of the motion of a scene. In both cases, the temporally offset content behaves correctly with respect to occlusions and perspective changes. As these methods require depth for the foreground object, video processing application 150 may use depth acquired by a Kinect® sensor.

Inaccurate depth information may make dealing with scene point occlusions difficult. In some implementations, video processing system 100 relies on $s_{ref}$ and scene point redundancy to prevent color bleeding artifacts. However, using this approach for dynamic foreground objects, video processing application 100 can only capture a single observation at a given moment of time. For instances when video processing application 150 has neither a reference sample nor a significant number of samples with which to determine a reasonable prior, video processing application 150 may use the following simple occlusion heuristic to prevent color bleed-through for scenes with reasonable depth values, e.g., from a Kinect®. Filtering module 153 may introduce a sample depth order $s_{ord}$, where $s_{ord}$ is the number of samples in S(p) that are closer to p than the current sample s, $$s_{ord} = \#\{q \in S | (p-q)^2 < (p-s)^2\} \qquad (11)$$

The weighting function applied by filtering module 153 becomes:

$$w_{action} = \xi(s_f) \exp\left(-\frac{s_{ord}^2}{2\sigma_{ord}^2}\right) \qquad (12)$$

In some implementations, filtering module 153 may use $\sigma_{ord}=10$ to emphasize the scene points that are the closest to the camera used to capture video 140, or having a depth closest to display 195.

Figure 7:
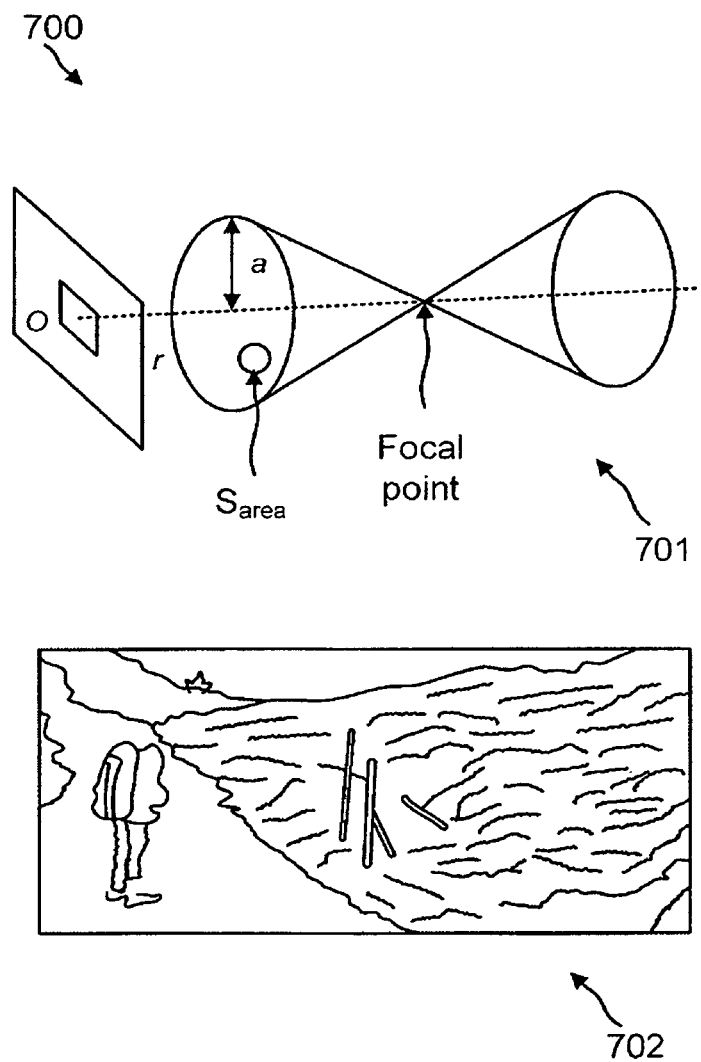
FIG. 7 shows an example of a scene-space video processing effect, according to one implementation of the present disclosure.

FIG. 7 shows an example of a scene-space video processing effect, according to one implementation of the present disclosure. Diagram 700 shows a virtual aperture effect of video processing application 150. With appropriate weighting functions, video processing system 100 can also represent complex effects such as virtual apertures, exploiting the existence of samples in a coherent scene-space. To do this, video processing system 100 models an approximate physical aperture in scene-space and weights the sampled scene points accordingly. This allows video processing application 150 to create arbitrary aperture effects, such as focus pulls and focus manifolds defined in scene-space.

At 701, filtering module 153 applies a weighting function for an approximate virtual aperture as a double cone with its thinnest point $a_0$ at the focal point $z_0$. The slope $a_s$ of the cone defines the size of the aperture as a function of distance from focal point, $$a(z) = a_0 + |z_0 - z| * a_s \qquad (13)$$

To avoid aliasing artifacts, video processing system 100 uses the sample area $s_{area}$ introduced previously to weight each sample by the ratio of its size and the aperture size at its scene-space position, because scene points carry the most information at their observed scale.

With r as the distance of $s_{xyz}$ along the camera viewing ray, and q as distance from the ray to s, filtering module 153 may use a weighting function of the form:

$$w_{va} = \begin{cases} \frac{S_{area}}{\pi a(r)^2} & \text{when } q < a(r) \\ 0 & \text{else} \end{cases} \quad (14)$$

Image 702 shows an exemplary image processed using a synthetic aperture. In some implementations, video processing application 150 may not use multiple viewpoints at the same time instance, but may use scene points sampled from neighboring frames to compute aperture effects.

Figure 8:
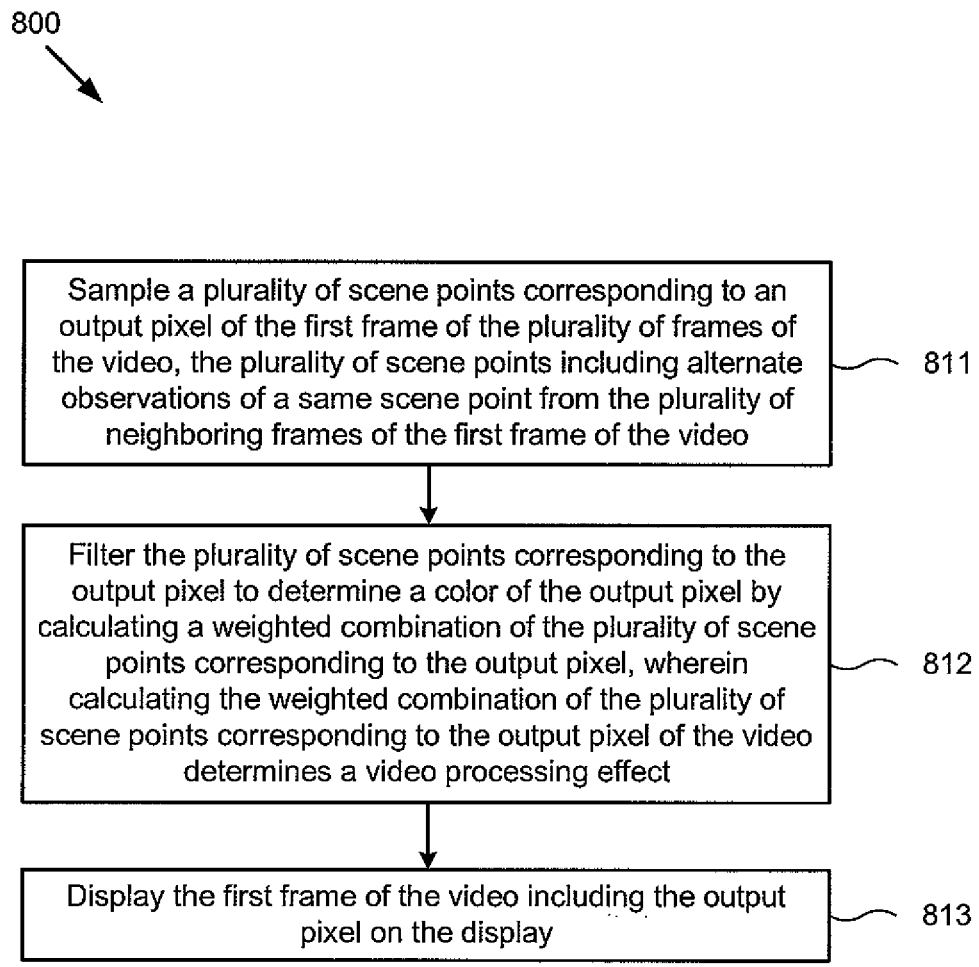
FIG. 8 shows an exemplary flowchart illustrating a method of scene-space video processing, according to one implementation of the present disclosure.

FIG. 8 shows an exemplary flowchart illustrating a method of scene-space video processing, according to one implementation of the present disclosure. At 811, video processing application 150 samples a plurality of scene points corresponding to an output pixel of a first frame of a plurality of frames of the video, the plurality of scene points include alternate observations of a same scene point from the plurality of neighboring frames of the first frame of the video. In some implementations, neighboring frames may include a frame immediately preceding the first frame in video 140, a frame immediately succeeding the first frame in video 140, a plurality of frames sequentially preceding the first frame in video 140, or a plurality of frames sequentially succeeding the first frame in video 140, or a combination of frames preceding and succeeding the first frame in video 140. Scene points may refer to points in the first frame that are visible to a pixel when the first frame is displayed on a display. In some implementations, scene points that are visible in a neighboring frame, but occluded in the first frame, may be included in the sample.

At 812, video processing application 150 filters the plurality of scene points corresponding to the output pixel to determine a color of the output pixel by calculating a weighted combination of the plurality of scene points corresponding to the output pixel. In some implementations, calculating the weighted combination of the plurality of scene points corresponding to the output pixel of the video may determine a video processing effect. At 813, video processing system 100 displays the first frame of the video including the output pixel on display 195.

Figure 9:
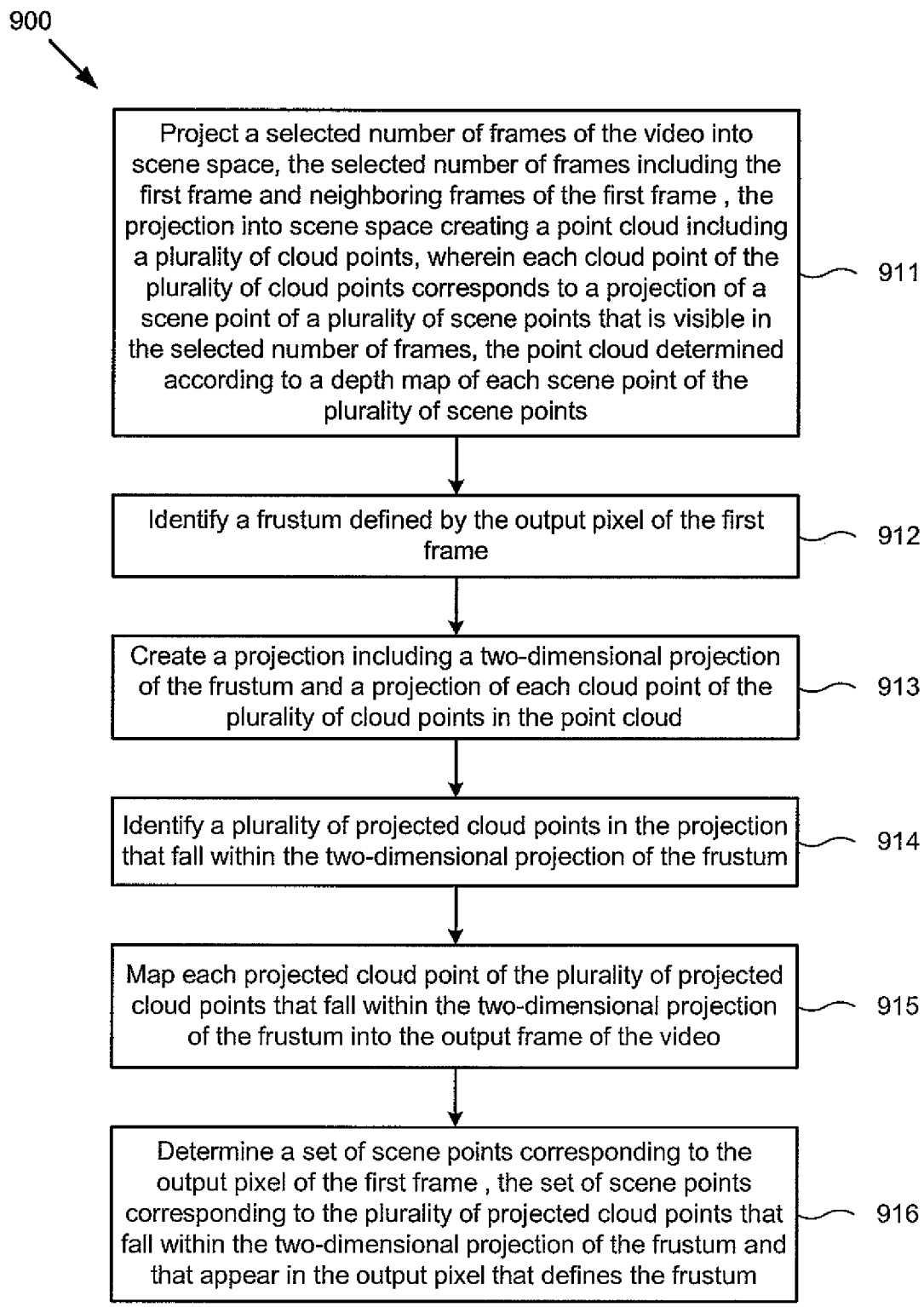
FIG. 9 shows an exemplary flowchart illustrating a method of scene-space sampling, according to one implementation of the present disclosure.

FIG. 9 shows an exemplary flowchart illustrating a method of scene-space sampling, according to one implementation of the present disclosure. At 911, sampling module 151 projects a selected number of frames of the video into scene-space, the selected number of frames including a first frame and neighboring frames of the first frame, the projection into scene-space creating a point cloud including a plurality of cloud points, wherein each cloud point of the plurality of cloud points corresponds to a projection of a scene point of a plurality of scene points that is visible in the selected number of frames, the point cloud determined according to a depth map of each scene point of the plurality of scene points.

At 912, sampling module 151 identifies a frustum defined by the output pixel of the first frame. At 913, sampling module 151 creates a projection including a 2D projection of the frustum and a projection of each cloud point of the plurality of cloud points in the point cloud. At 914, sampling module 151 identifies a plurality of projected cloud points in the projection that fall within the 2D projection of the frustum.

At 915, sampling module 151 maps each projected cloud point of the plurality of projected cloud points that fall within the 2D projection of the frustum into the output frame of the video. At 916, sampling module 151 determines a set of scene points corresponding to the output pixel of the first frame, the set of scene points corresponding to the plurality of projected cloud points that fall within the 2D projection of the frustum and that appear in the output pixel that defines the frustum.

Figure 10:
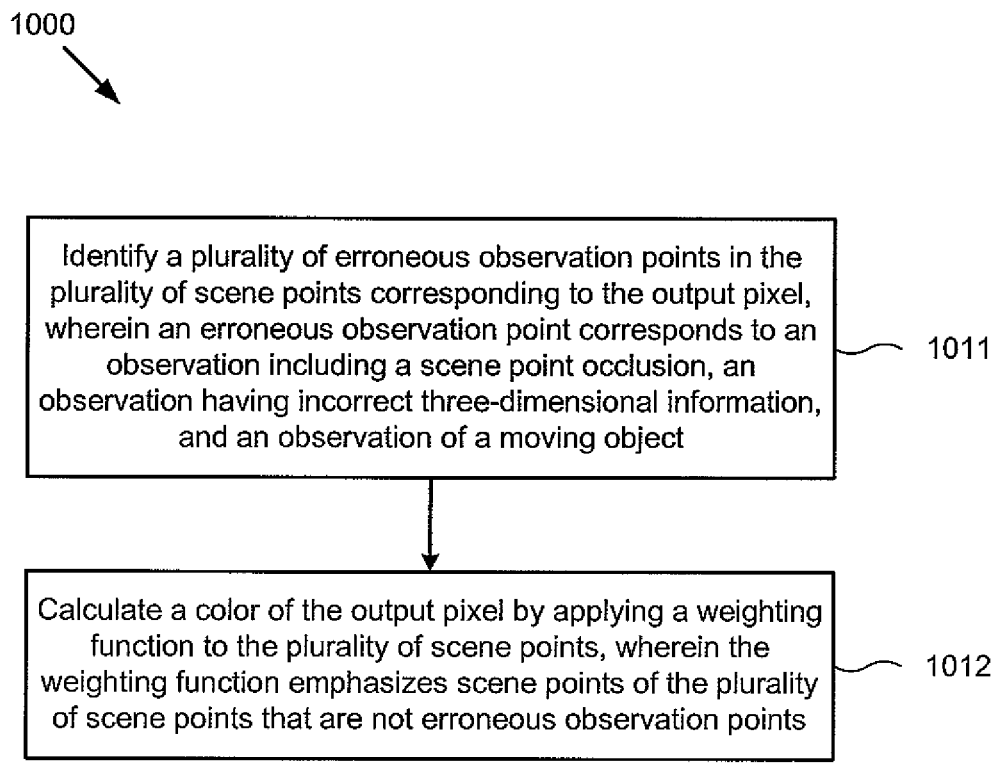
FIG. 10 shows an exemplary flowchart illustrating a method of scene-space filtering, according to one implementation of the present disclosure.

FIG. 10 shows an exemplary flowchart illustrating a method of scene-space filtering, according to one implementation of the present disclosure. At 1011, filtering module 153 identifies a plurality of erroneous observation points in the plurality of scene points corresponding to the output pixel, wherein an erroneous observation point corresponds to an observation including a scene point occlusion, an observation having incorrect 3D information, and an observation of a moving object. At 1012, filtering module 153 calculates a color of the output pixel by applying a weighting function to the plurality of scene points, wherein the weighting function emphasizes scene points of the plurality of scene points that are not erroneous observation points.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A video processing system for use with a video having a plurality of frames including a first frame and a plurality of neighboring frames of the first frame, the system including:
    a display;
    a memory storing a video processing application; and
    a processor configured to execute the video processing application to:
        project a plurality of scene points of a selected number of the plurality of frames of the video produced by a camera into a three-dimensional (3D) scene-space using camera calibration parameters of the camera and depth values of the plurality of scene points, the selected number of the plurality of frames being produced by the camera and include the first frame and the plurality neighboring frames of the first frame, wherein projecting the plurality of scene points into the 3D scene-space creates a point cloud including a plurality of cloud points, wherein each cloud point of the plurality of cloud points corresponds to a projection of a scene point of the plurality of scene points, and wherein each of the plurality of scene points is a portion of a frame of video that is visible in a pixel of the frame of video when displayed on the display;
        sample, for each of a plurality of output pixels of the first frame, the projected plurality of scene points corresponding to an output pixel among the plurality of output pixels of the first frame, the projected plurality of scene points including alternate observations of a same scene point from the plurality of neighboring frames of the first frame; and filter the sampled plurality of scene points corresponding to the output pixel to determine a color of the output pixel by calculating a weighted combination of the sampled plurality of scene points to determine a video processing effect including one of a denoising, an object semi-transparency or a video inpainting, wherein filtering includes:

identifying one or more erroneous observation points in the sampled plurality of scene points corresponding to the output pixel, wherein each of the one or more erroneous observation points corresponds to one of a scene point occlusion, incorrect three-dimensional (3D) information, or a moving object; and calculating the color of the output pixel by applying a weighting function to the sampled plurality of scene points, wherein the weighting function emphasizes scene points of the sampled plurality of scene points that are not the one or more erroneous observation points.

2. The video processing system of claim 1, wherein the video processing effect further comprises a deblurring.

3. The video processing system of claim 1, wherein the video processing effect further comprises a super resolution.

4. The video processing system of claim 1, wherein the video processing effect further comprises a computational scene-space shutter.

5. The video processing system of claim 1, wherein to sample the projected plurality of scene points corresponding to the output pixel of the video, the processor is further configured to:

identify a frustum defined by the output pixel of the first frame;

create a projection including a two-dimensional (2D) projection of the frustum and a projection of each cloud point of the plurality of cloud points in the point cloud;

identify a plurality of projected cloud points in the projection that fall within the 2D projection of the frustum;

map each projected cloud point of the plurality of projected cloud points that falls within the 2D projection of the frustum into the output frame of the video; and determine a set of scene points corresponding to the output pixel of the first frame, the set of scene points corresponding to the plurality of projected cloud points that fall within the 2D projection of the frustum and that appear in the output pixel that defines the frustum.

6. A method of video processing for use by a video processing system including a display, a memory, and a processor, the method comprising:

projecting a plurality of scene points of a selected number of a plurality of frames of the video produced by a camera into a three-dimensional (3D) scene-space using camera calibration parameters of the camera and depth values of the plurality of scene points, the selected number of the plurality of frames being produced by the camera and include a first frame and a plurality of neighboring frames of the first frame, wherein projecting the plurality of scene points into the 3D scene-space creates a point cloud including a plurality of cloud points, wherein each cloud point of the plurality of cloud points corresponds to a projection of a scene point of the plurality of scene points, and wherein each of the plurality of scenes point is a portion of a frame of video that is visible in a pixel of the frame of video when displayed on the display;

sampling, for each of a plurality of output pixels of the first frame, using the processor, the projected plurality of scene points corresponding to an output pixel among the plurality of output pixels of the first frame, the projected plurality of scene points including alternate observations of a same scene point from the plurality of neighboring frames of the first frame; and filtering, using the processor, the sampled plurality of scene points corresponding to the output pixel to determine a color of the output pixel by calculating a weighted combination of the sampled plurality of scene points to determine a video processing effect including one of a denoising, an object semi-transparency or a video inpainting, wherein filtering includes:

identifying one or more erroneous observation points in the sampled plurality of scene points corresponding to the output pixel, wherein each of the one or more erroneous observation points corresponds to one of a scene point occlusion, incorrect three-dimensional (3D) information, or a moving object; and calculating the color of the output pixel by applying a weighting function to the sampled plurality of scene points, wherein the weighting function emphasizes scene points of the sampled plurality of scene points that are not the one or more erroneous observation points.

7. The method of claim 6, wherein the video processing effect further comprises a deblurring.

8. The method of claim 6, wherein the video processing effect further comprises a super resolution.

9. The method of claim 6, wherein the video processing effect further comprises a computational scene-space shutter.

10. The method of claim 6, wherein sampling the sampled plurality of scene points corresponding to the output pixel of the video further comprises:

identifying, using the processor, a frustum defined by the output pixel of the first frame;

creating, using the processor, a projection including a two-dimensional (2D) projection of the frustum and a projection of each cloud point of the plurality of cloud points in the point cloud;

identifying, using the processor, a plurality of projected cloud points in the projection that fall within the 2D projection of the frustum;

mapping, using the processor, each projected cloud point of the plurality of projected cloud points that falls within the 2D projection of the frustum into the output frame of the video; and determining, using the processor, a set of scene points corresponding to the output pixel of the first frame, the set of scene points corresponding to the plurality of projected cloud points that fall within the 2D projection of the frustum and that appear in the output pixel that defines the frustum.

* * * * *